(12) United States Patent
Watanabe et al.

(10) Patent No.: US 6,720,869 B2
(45) Date of Patent: Apr. 13, 2004

(54) TIRE PNEUMATIC PRESSURE DETECTOR

(75) Inventors: Takashi Watanabe, Nagoya (JP);
Nobuhiko Makino, Anjyo (JP);
Takeshi Hatoh, Nagoya (JP); Takeyasu Taguchi, Nagoya (JP); Osamu Tanaka, Ikeda (JP); Takumo Matsuki, Ikeda (JP)

(73) Assignees: Denso Corporation, Kariya (JP);
Daihatsu Motor Co., Ltd., Osaka (JP)

(*) Notice: Subject to any disclaimer, the term of this patent is extended or adjusted under 35 U.S.C. 154(b) by 0 days.

(21) Appl. No.: 10/022,223

(22) Filed: Dec. 20, 2001

(65) Prior Publication Data
US 2002/0089417 A1 Jul. 11, 2002

(30) Foreign Application Priority Data
Jan. 10, 2001 (JP) ........................... 2001-002638

(51) Int. Cl.[7] ............................................. B60C 23/02
(52) U.S. Cl. .................. 340/442; 340/444; 73/146
(58) Field of Search .................. 340/442, 443, 340/444, 445, 446, 447, 448; 73/146.5, 146, 146.2

(56) References Cited

U.S. PATENT DOCUMENTS

| 3,930,223 A | * | 12/1975 | Tsagas | 340/442 |
|---|---|---|---|---|
| 5,559,484 A | * | 9/1996 | Nowicki et al. | 340/447 |
| 5,710,539 A | * | 1/1998 | Iida | 340/444 |
| 5,754,102 A | * | 5/1998 | Yanase | 340/442 |
| 5,774,048 A | * | 6/1998 | Achterholt | 340/447 |
| 5,940,781 A | * | 8/1999 | Nakajima | 702/98 |
| 6,014,599 A | | 1/2000 | Inoue et al. | |
| 6,087,930 A | | 7/2000 | Kulka et al. | |
| 6,469,621 B1 | * | 10/2002 | Vredevoogd et al. | 340/445 |

FOREIGN PATENT DOCUMENTS

| EP | 1223055 A2 | * | 7/2002 | ........... B60C/23/04 |
|---|---|---|---|---|
| JP | 7-52618 | * | 2/1995 | |
| JP | 10-71819 | | 3/1998 | |
| JP | 2002-205518 | * | 7/2002 | |
| WO | WO 02/07996 A1 | * | 1/2002 | |

* cited by examiner

Primary Examiner—Nina Tong
(74) Attorney, Agent, or Firm—Posz & Bethards, PLC

(57) ABSTRACT

A tire pneumatic pressure detector includes a tire pneumatic pressure detection unit, a first memory storing data associated with a timing at which the drop of tire pneumatic pressure occurs, a second memory storing second data including one or more of a lapse of time from which the tire pneumatic pressure drop occurs, and third data associated with running distance from the timing when a fault diagnosis signal is input.

6 Claims, 6 Drawing Sheets

TIRE PNEUMATIC PRESSURE DETECTOR

BACKGROUND OF THE INVENTION.

1. Field of the Invention

This invention relates to a tire pneumatic pressure detector capable of detecting blowout of a tire or the degree of the drop of its pneumatic pressure.

2. Description of the Related Art

A tire pneumatic pressure detector according to the prior art detects blowout of a tire or the drop its pneumatic pressure, and raises an alarm, to a driver, by turning on an alarm lamp (e.g. Japanese Unexamined Patent Publication (Kokai) No. 10-71819).

However, detectors that raise an alarm in accordance with the blowout of the tire or the degree of the drop of the pneumatic pressure have not yet been known, and the driver cannot judge the degrees of blowout of the tire and the drop of the pneumatic pressure. Particularly in the case of a so-called "run-flat tire", a vehicle can run to a certain extent even when the pneumatic pressure drops to zero. However, as the vehicle naturally cannot run unlimitedly, it is preferred for the driver to know the degree of blowout or how much more the vehicle can run.

On the other hand, it is possible to collect data of running of the vehicle after blowout of the tire or the drop of its pneumatic pressure under a test condition (data representing the relation between a running distance after blowout of the tire and the tire condition after its blowout), but data under the practical use condition by users in general (hereinafter called the "market data") have not yet been collected.

SUMMARY OF THE INVENTION

In view of the background described above, it is an object of the present invention to make it possible to judge the degrees of blowout of a tire and the drop of its pneumatic pressure.

It is another object of the present invention to make it possible to collect the market data during running after blowout of the tire or after the drop of its pneumatic pressure.

According to a first aspect of the present invention for accomplishing the objects described above, there is provided a tire pneumatic pressure detector comprising tire pneumatic pressure detection means for detecting a tire pneumatic pressure; pneumatic pressure drop detection means for comparing the tire pneumatic pressure detected by the tire pneumatic pressure detection means with a predetermined value, and detecting the drop of the tire pneumatic pressure when the tire pneumatic pressure is lower than the predetermined value; and first memory means for storing data about a timing at which the drop of the tire pneumatic pressure occurs.

Because the first memory means stores the timing at which the drop of the tire pneumatic pressure occurs, the degrees of blowout and the drop of the pneumatic pressure can be judged on the basis of this timing.

According to a second aspect of the present invention, there is provided the tire pneumatic pressure detector described above, which further comprises second memory means for storing the lapse of time from the timing at which the drop of the tire pneumatic pressure occurs, or data about a running distance from this timing. In this way, the degrees of blowout and the drop of the pneumatic pressure can be judged from the lapse of time and the running distance.

According to a third aspect of the present invention, there is provided a tire pneumatic pressure detector which further comprises an alarm for warning the drop of the tire pneumatic pressure when the drop of the tire pneumatic pressure occurs, wherein the alarm changes the warning method in accordance with the data stored in the second memory means. Consequently, the driver can judge the degrees of blowout and the drop of the pneumatic pressure. More concretely, as represented by a fourth aspect of the present invention, a flashing frequency of an alarm lamp may be set to a higher frequency for a longer lapse of time or a longer running distance than a shorter lapse or time or a shorter running distance.

According to a fifth aspect of the present invention, the tire pneumatic pressure detector described above further comprises switching number of times detection means for detecting a switching number of times of ON/OFF of an ignition switch, wherein, when the number a of times of switching detected by the switching number of times detection means is greater than a predetermined number of times when the tire pneumatic pressure drop detection means detects that the tire pneumatic pressure is higher than the predetermined value, the data stored in the second memory means is cleared. According to this construction, it becomes possible to prevent the data stored in the second memory means from being readily cleared by the chattering of the tire pneumatic pressure judgment value very close to the threshold level of warning.

According to a sixth aspect of the present invention, the tire pneumatic pressure detector described above has its feature in that when a fault diagnosing device inputs a fault diagnosing signal, the lapse of time from the timing at which the drop of the tire pneumatic pressure occurs or the data about the running distance from the timing, each stored in the second memory means, is outputted to the fault diagnosing device. When the fault diagnosing device can read out the data stored in the second memory means, the market data about blowout of the tire and about running after the drop of the air pressure can be acquired through the fault diagnosing device when the tire is exchanged in a service station, for example.

The means described above represent concrete means described in the later-appearing embodiment of the invention.

DESCRIPTION OF THE PREFERRED EMBODIMENTS

First Embodiment

Figure 1:
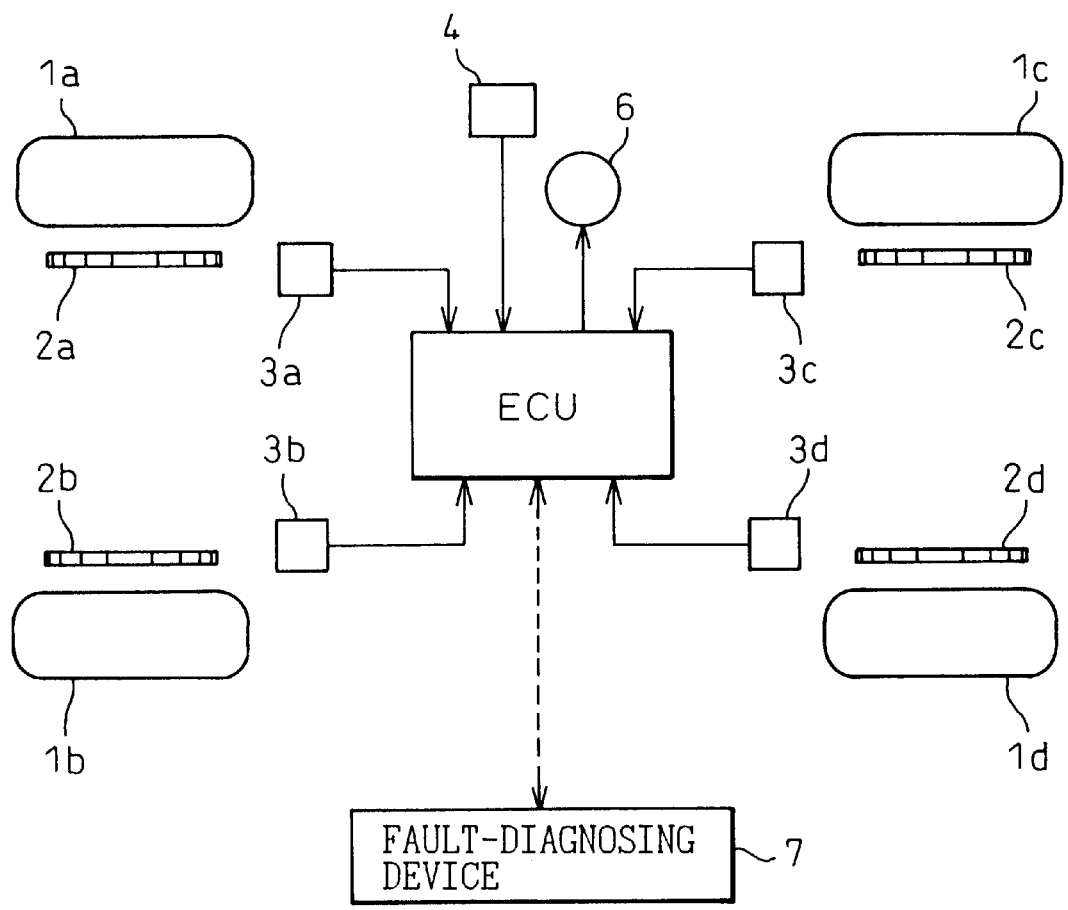
FIG. 1 shows a schematic construction of a tire pneumatic pressure detector according to a first embodiment of the present invention.

FIG. 1 shows a schematic construction of a tire pneumatic pressure detector according to a first embodiment of the present invention. The tire pneumatic pressure detector will be explained with reference to this drawing.

The tire pneumatic pressure detector detects the drop of the pneumatic pressure of the tire of any wheel. On detecting the drop of the tire pneumatic pressure, this detector raises an alarm and notifies a driver of the pressure drop.

The tire pneumatic pressure detector includes a wheel speed sensor $3a$ to $3d$ as wheel speed detection means so disposed as to correspond to a rotor $2a$ to $2d$ that is rotated with each wheel $1a$ to $1d$ of a vehicle, an ignition switch sensor 4 for detecting a change-over of ON/OFF of an ignition switch 4 (hereinafter called the "IG switch"), an arithmetic unit 5 (hereinafter called the "ECU") to which the detection signal from each sensor $3a$ to $3d$ and 4 is inputted, and an alarm 6 for raising an alarm and notifying the driver of the drop of the pneumatic pressure of the tire. The ECU 5 comprises a microcomputer, or the like, and executes various kinds of processing such as an initialization processing, a pneumatic pressure drop judgment processing, a running distance storage processing at the drop of the pneumatic pressure, a pneumatic pressure drop warning processing and a running distance output processing at the drop of the pneumatic pressure as will be described later. When these processing detect the drop of the tire pneumatic pressure, the ECU 5 outputs the alarm signal representing the drop of the pneumatic pressure to the alarm 6. Receiving this alarm signal, the alarm 6 turns on an alarm lamp provided inside a cabin, for example, and warns the driver of the drop of the tire pneumatic pressure.

On the other hand, the tire pneumatic pressure detector can be connected to a fault-diagnosing device 7. This fault-diagnosing device 7 is used in a service station, for example, and is so constituted as to be capable of reading out the market data of blowout of the tire or data of running after the drop of its pneumatic pressure from the ECU 5.

Figure 2:
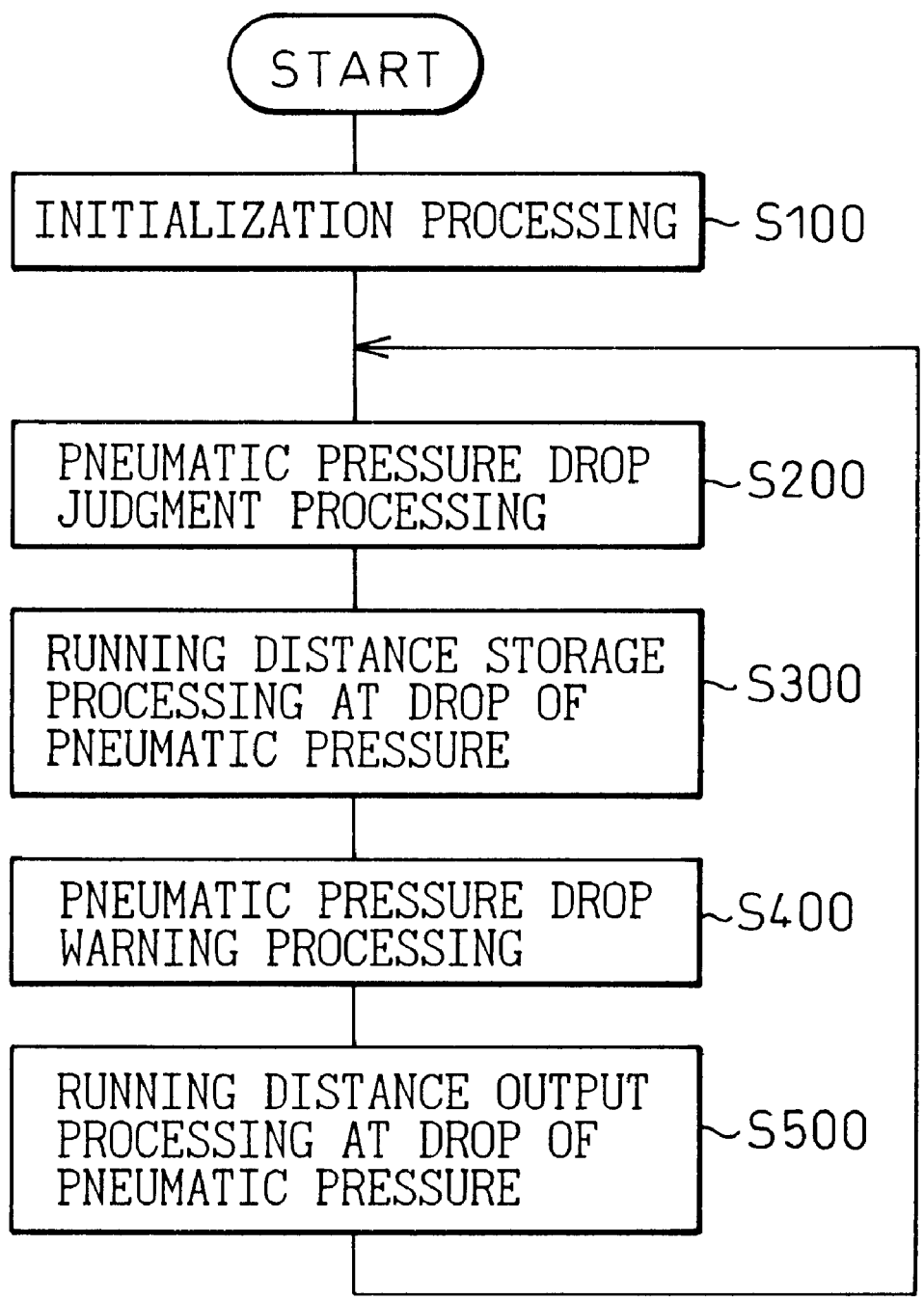
FIG. 2 is a flowchart showing a tire pneumatic pressure detection processing executed by the tire pneumatic pressure detector shown in FIG. 1.

Next, FIG. 2 shows a flowchart of the tire pneumatic pressure detection processing by the tire pneumatic pressure detector having the construction described above. The detail of the tire pneumatic pressure detection processing will be explained with reference to the flowchart.

First, the IG switch is turned ON and the tire pneumatic pressure detection processing is executed. An initialization processing is executed in Step S100 to initialize the ECU 5. Steps S200 to S500 are serially conducted to thereby execute a pneumatic pressure drop judgment processing, a running distance storage processing at the drop of the pneumatic pressure, a pneumatic pressure drop warning processing and a running distance output processing at the drop of the pneumatic pressure. The flow then returns to step S200, and these processing are repeated.

FIGS. 3 to 6 are flowcharts of the pneumatic pressure drop judgment processing, the running distance storage processing at the drop of the pneumatic pressure, the pneumatic pressure drop warning processing and the running distance output processing at the drop of the pneumatic pressure. Each processing will be explained in detail with reference to each corresponding flowchart.

Figure 3:
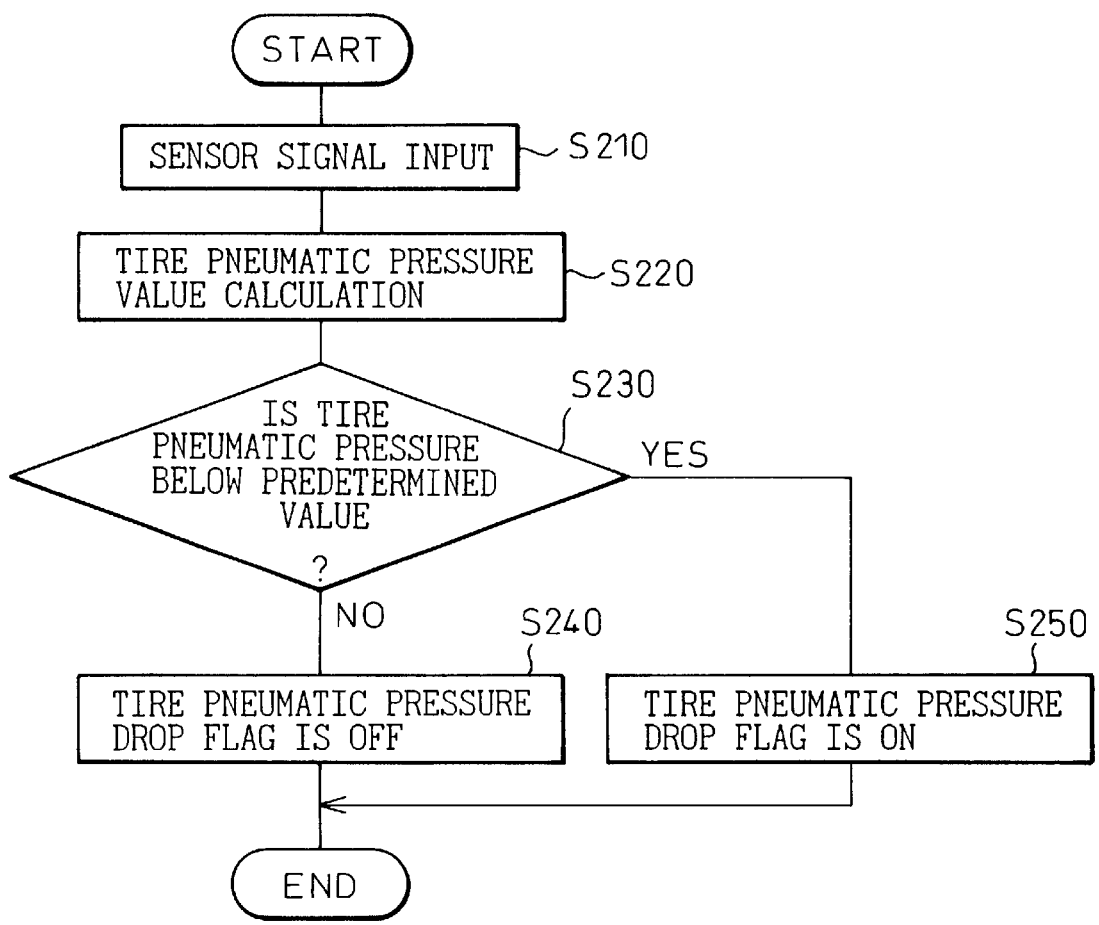
FIG. 3 is a flowchart showing the detail of a pneumatic pressure drop judgment processing in FIG. 2.

First, the detail of the pneumatic pressure drop judgment processing will be explained with reference to the flowchart of the pneumatic pressure drop judgment processing shown in FIG. 3.

After the initialization processing is completed as described above, the flow proceeds to Step S210 and the sensor input is made from each wheel speed sensor $3a$ to $3d$. Pneumatic pressure detection means provided inside the ECU5 executes this tire pneumatic pressure value calculation processing on the basis of the sensor signal inputted in Step S210. In this processing, the tire pneumatic pressure value may well be detected by a dynamic load system (refer to Japanese Unexamined Patent Publication (Kokai) No. 10-100624, for example) that calculates the tire pneumatic pressure value on the basis of the rotating condition value determined by differentiating the ratio of the wheel speeds of the wheels positioned in an orthogonal relationship, or a resonance frequency system (refer to Japanese Unexamined. Patent Publication (Kokai) No. 5-133831) that calculates the tire pneumatic pressure value on the basis of the resonance phenomenon of the wheel speed signals.

Next, the flow proceeds to Step 230 and whether or not the tire pneumatic pressure is below a predetermined value (1 atm, for example) is judged on the basis of the tire pneumatic pressure obtained in Step S220. Pneumatic pressure drop detection means provided inside the ECU 5 executes this processing. If the judgment result proves NO, the tire pneumatic pressure is not judged as dropping and the flow proceeds to Step S240. Here, a tire pneumatic drop flag is turned OFF, completing the pneumatic pressure drop judgment processing. If the judgment result proves YES, on the contrary, the tire pneumatic pressure is judged as dropping and the flow proceeds to Step S250, where the tire pneumatic pressure drop flag is turned ON. Memory means (first memory means) such as a memory provided to the ECU 5 stores the timing at which the flag is turned ON, and the pneumatic pressure drop judgment processing is completed. A running distance storage processing at the drop of the pneumatic pressure is thereafter executed.

Figure 4:
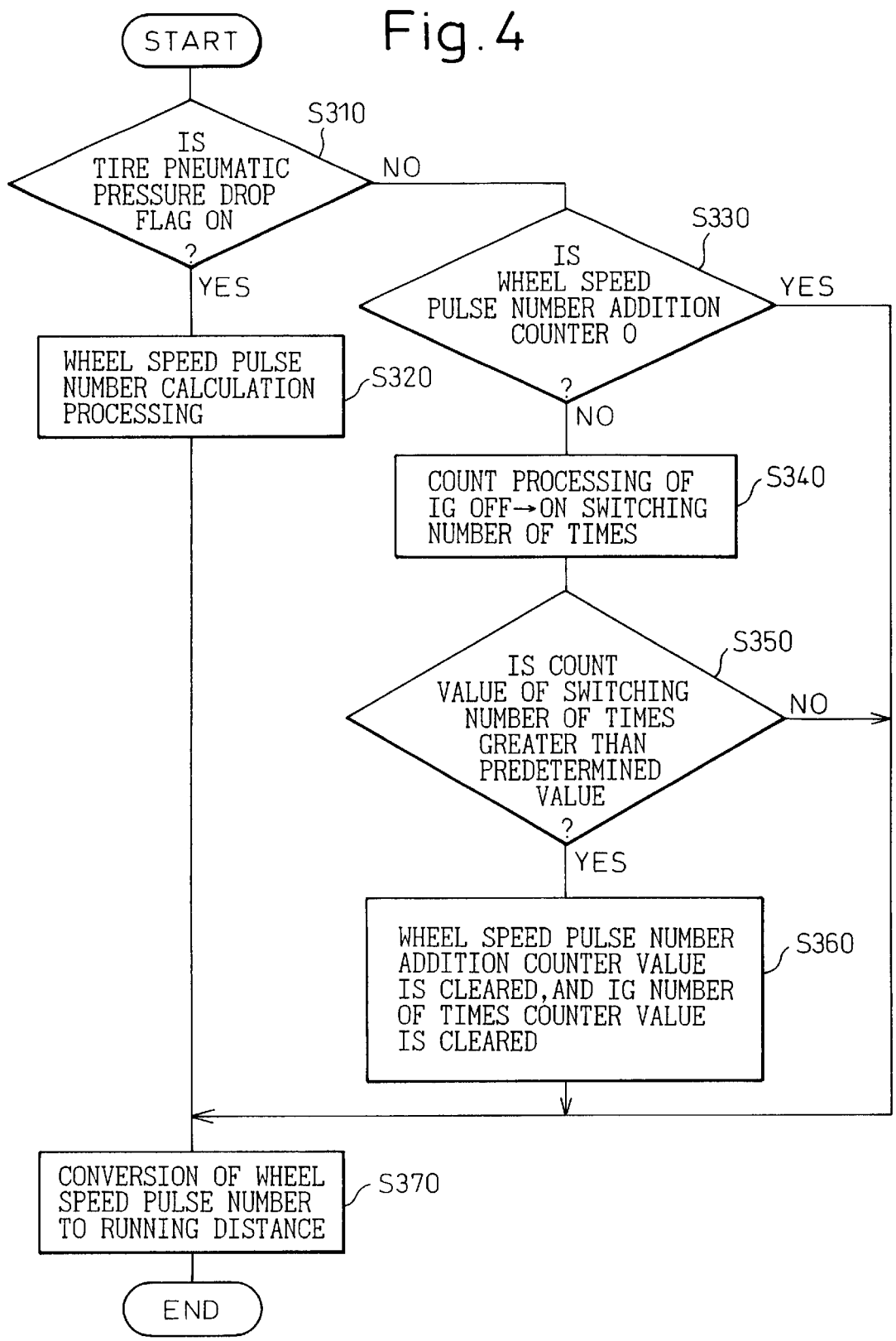
FIG. 4 is a flowchart showing the detail of a running distance storage processing at the drop of the pneumatic pressure in FIG. 2.

This processing will be explained in detail with reference to the flowchart of the running distance storage processing at the drop of the pneumatic pressure shown in FIG. 4.

In Step. 310, whether or not the tire pneumatic pressure drop flag is turned ON is judged. In other words, whether or not the tire pneumatic pressure has dropped is judged. When the judgment result proves YES, the flow proceeds to Step S320, and a wheel speed pulse number addition processing for adding the pulse numbers of the wheel speed signals from the wheel speed sensors $3a$ to $3d$ is executed. Concretely, the wheel speed pulse number is added up as a wheel speed pulse number addition counter, not shown, provided to the ECU 5, is incremented in such a fashion as to correspond to the wheel speed pulse. In this way, the wheel speed pulse number corresponding to the running distance after the drop of the tire pneumatic pressure below the predetermined value can be determined. After the wheel speed pulse number is thus added, the flow proceeds to Step S370.

The pulse number of the wheel speed signal may be determined from any of the wheel speed sensors $3a$ to $3d$. However, when the running distance determined by the later appearing Step S370 is equal to the distance of an odometer provided inside the cabin, the mean value of the wheel speed pulses of the two driving wheels may be used as the pulse number described above. Consequently, the influences of turning of the vehicle, etc, can be cancelled, and the calculation of the wheel speed pulses can be simply conducted.

When the judgment result in Step S310 proves NO, on the other hand, the flow proceeds to Step S330, and whether or not the wheel speed pulse number addition counter is zero (0) is judged. When the drop of the tire pneumatic pressure has not existed so far, the judgment result proves YES and the flow proceeds to Step S370. When the tire pneumatic pressure drop judgment is made even once, on the contrary, the flow proceeds to Step S340.

In the subsequent Step S340, the number of times of switching of the IG switch from OFF to ON is counted on the basis of the IG switch sensor 4. A switching number counter, not shown, provided to the ECU 5 counts this number of times of switching, and the count value is obtained by reading out the count value of this counter. Incidentally, the switching number of times detection means provided to the ECU 5 executes this processing. The flow then proceeds to Step S350.

In Step 350, whether or not the count value of the switching number of times counter is greater than a predetermined value is judged. When the judgment result proves YES, the flow proceeds to Step S360. In this Step S360, the count value of the wheel speed pulse number addition counter and the count value of the switching number of times counter are cleared. When the judgment result proves NO, the count values are not cleared. In other words, the count values are cleared only when ON/OFF switching of the IG switch continues a predetermined number of times. This is because the tire pneumatic pressure drop flag might be turned OFF due to the chattering of the judgment value very close to the threshold level of warning. The count values are cleared only when the conditions described above are satisfied, but are prevented from being readily cleared by the chattering.

In the subsequent Step S370, the count value of the wheel speed pulse number addition counter is converted to the running distance, and the running distance after the occurrence of the drop of the tire pneumatic pressure (after the tire pneumatic pressure drop flag is turned ON) is determined. Memory means (second memory means) such as a memory provided to the ECU 5 stores the data of this running distance. Thereafter, the running distance storage processing at the drop of the pneumatic pressure is completed, and a pneumatic pressure drop warning processing is executed.

Figure 5:
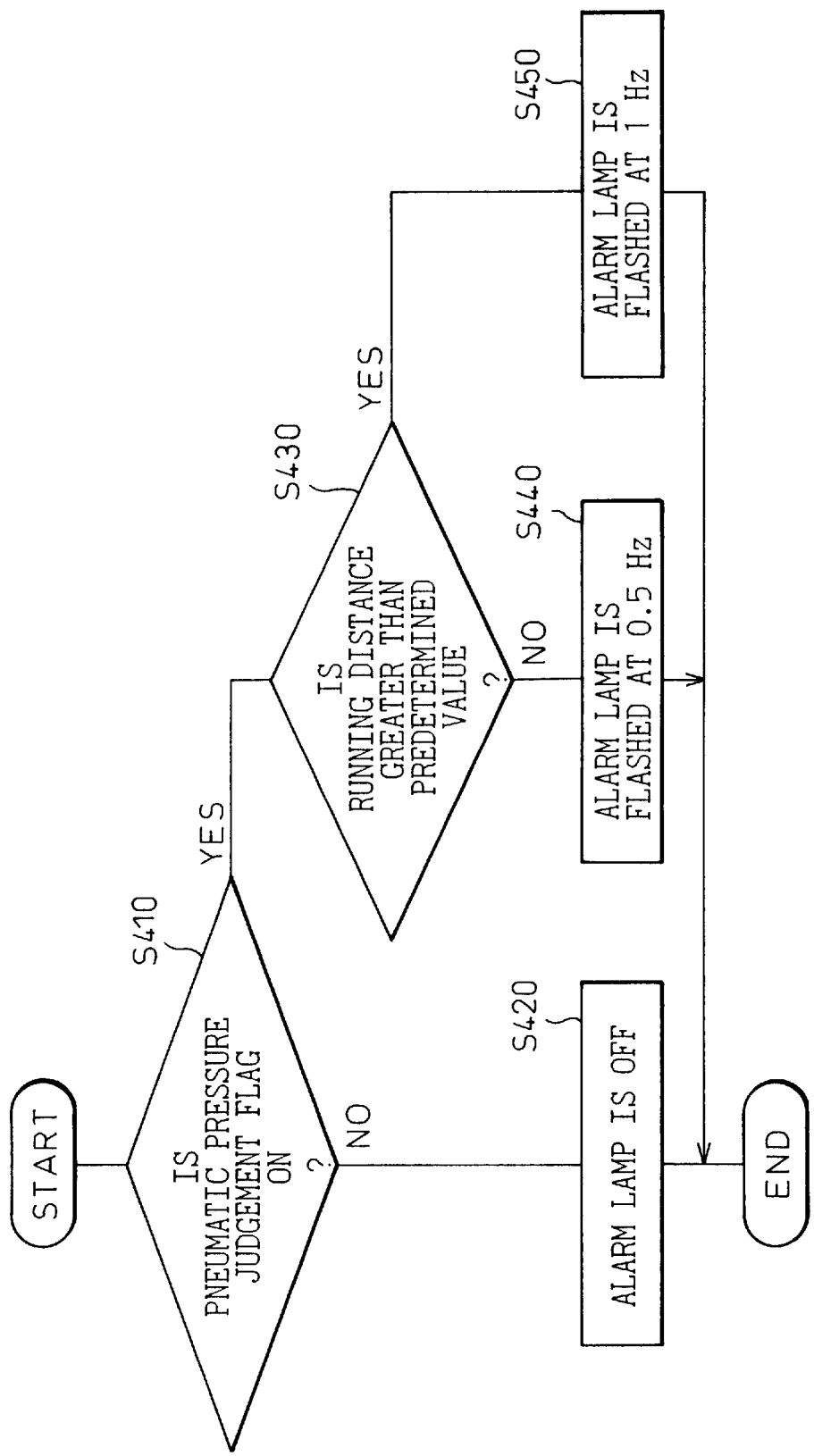
FIG. 5 is a flowchart showing the detail of a pneumatic pressure drop warning processing in FIG. 2.

This warning processing will be explained in detail with reference to the flowchart of the running distance storage processing at the drop of the pneumatic pressure drop shown in FIG. 5.

First, whether or not the tire pneumatic pressure drop flag is turned ON is judged in Step S410. In other words, whether or not the tire pneumatic pressure has dropped is judged. When the judgment result proves NO, the flow proceeds to Step S420 and the alarm lamp provided to the alarm 6 is turned OFF to represent that the tire pneumatic pressure has not dropped.

When the tire pneumatic pressure has dropped, on the contrary, the flow proceeds to Step S430, and whether or not the running distance from the occurrence of the drop of the tire pneumatic pressure, that is, the running distance determined in Step S370, is greater than a predetermined value is judged. When the running distance is not greater than the predetermined value, the flow proceeds to Step S440 and the alarm lamp provided to the alarm 6 is flashed at 0.5 Hz, for example. When the running distance is greater than the predetermined value, the flow proceeds to Step S450 and the alarm lamp is flashed at 1.0 Hz, for example.

Since the flashing frequency of the alarm lamp is changed in accordance with the running distance from the occurrence of the drop of the tire pneumatic pressure in this way, the flashing speed of the alarm lamp serves as the index representing the degree of blowout of the tire or how much more the vehicle can drive. Thereafter, a running distance output processing at the drop of the pneumatic pressure is executed.

Figure 6:
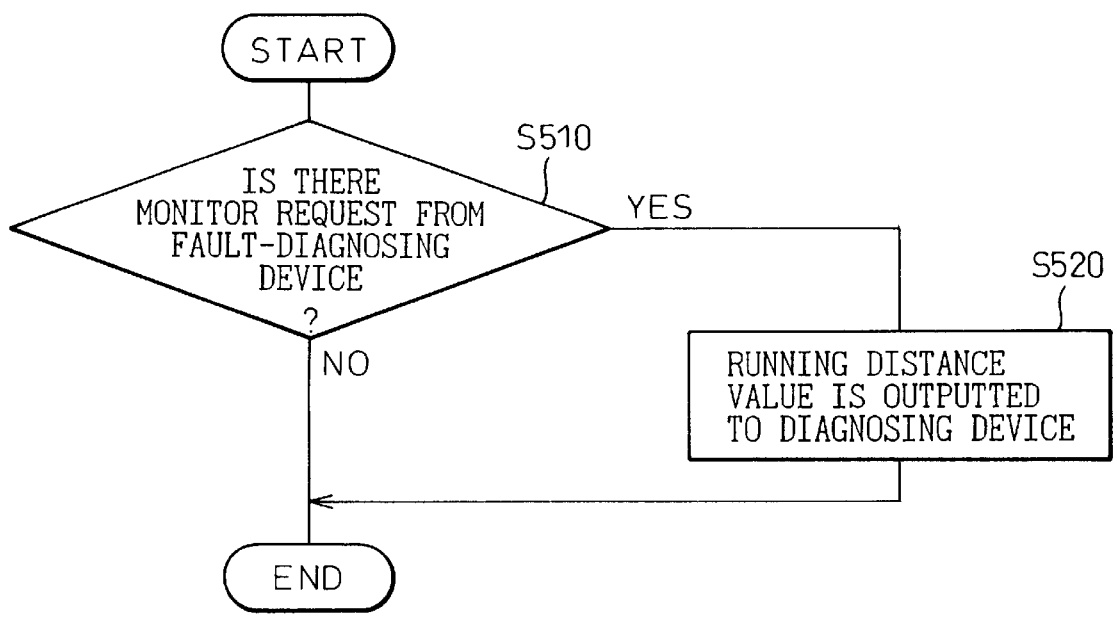
FIG. 6 is a flowchart showing the detail of a running distance output processing at the drop of the pneumatic pressure in FIG. 2.

This processing will be explained in detail with reference to the flowchart of the running distance output processing at the drop of the pneumatic pressure shown in FIG. 6.

First, in Step S510, whether or not a monitor request is generated by the diagnosing device 7 is detected. More concretely, the monitor request is generated when the diagnosing device 7 is connected to the ECU 5 and a predetermined signal is inputted from the diagnosing device 7 to the ECU 5.

When the judgment result is positive, the flow proceeds to Step S520, the ECU 5 outputs to the diagnosing device 7 the timing at which the drop of the tire pneumatic pressure occurs and the data of the running distance from the occurrence of the tire pneumatic pressure. Then, the running distance output processing at the drop of the pneumatic pressure is completed. When the judgment result is negative, on the contrary, the processing is, as such, completed.

In this way, the data about the timing at which the drop of the tire pneumatic pressure occurs and about the running distance from the occurrence of the drop of the tire pneumatic pressure is inputted to the diagnosing device 7, and the market data of blowout of the tire and of running after the drop of the pneumatic pressure can be acquired through the diagnosing device 7.

As explained above, because the flashing frequency of the alarm lamp is changed in accordance with the running distance from the occurrence of the drop of the tire pneumatic pressure, the flashing speed of the alarm lamp serves as the index representing the degree of blowout of the tire and how much more the vehicle can drive, and the driver can judge the degree of blowout and the degree of the drop of the pneumatic tire.

The data about the timing of the occurrence of the drop of the tire pneumatic pressure and about the running distance after the drop of the tire pneumatic pressure is stored so that the data can be inputted to the diagnosing device 7 when it is connected. Therefore, when the diagnosing device 7 is connected to the tire pneumatic pressure detector in a service station, or the like, the market data about blowout of the tire and about running after the drop of the pneumatic pressure can be acquired through the diagnosing device 7 when the tire is exchanged.

Other Embodiments

In the embodiment given above, the flashing frequency of the alarm lamp provided to the alarm 6 is changed in accordance with the running distance after the drop of the tire pneumatic pressure to represent the degree of blowout and the degree of the drop of the pneumatic pressure, but other warning methods may be employed, as well. For example, the color of the alarm lamp to be flashed may well be changed in accordance with the degree of blowout or the drop of the pneumatic pressure, or in the case of the alarm by using characters or sound, the warning method may be changed in accordance with the degree of blowout or the drop of the pneumatic pressure.

In the embodiment given above, the warning method is changed in accordance with the running distance after the drop of the tire pneumatic pressure. However, the warning method may be changed in accordance with the lapse of time (which may be either the mere lapse of time or the running time) after the drop of the tire pneumatic pressure. Changing of the warning method in accordance with the running distance after the drop of the tire pneumatic pressure as used in the embodiment can be applied particularly effectively to those types of tires which can run even when the pneumatic pressure drops to zero (0), but has a limit of the running distance, such as a run-flat tire. In the case of ordinary types of tires which encounter a running problem with the drop of the tire pneumatic pressure, however, it is effective to change the warning method in accordance with the lapse of time after the drop of the tire pneumatic pressure.

The embodiment given above represents the example where the tire pneumatic pressure value is determined in accordance with the dynamic load system or the resonance frequency system, but the tire pneumatic pressure may be directly detected by use of a pressure sensor provided inside each tire.

What is claimed is:

1. A tire pneumatic pressure detector comprising:

tire pneumatic pressure detection means for detecting a tire pneumatic pressure;

pneumatic pressure drop detection means for comparing the tire pneumatic pressure detected by said tire pneumatic pressure detection means with a predetermined value, and detecting a drop of the tire pneumatic pressure when the tire pneumatic pressure is tower than the predetermined value;

first memory means for storing first data associated with a timing of the drop of the tire pneumatic pressure;

second memory means for storing second data including one or more of: a lapse of time from said first data, and third data associated with a running distance from a point associated with said first data; and switching number detection means for detecting a number of switching times of an ignition switch;

wherein, when the number of switching times detected by said switching number detection means is greater than a predetermined number of times when said tire pneumatic pressure drop detection means detects that the tire pneumatic pressure is higher than said predetermined value, the second data stored in said second memory means is cleared.

2. A tire pneumatic pressure detector according to claim 1, further comprising an alarm for providing a warning when the drop of the tire pneumatic pressure occurs;

wherein said alarm changes a warning method in accordance with the second data.

3. A tire pneumatic pressure detector according to claim 2, wherein said alarm further includes an alarm lamp having a flashing frequency when said warning is being provided, and wherein said flashing frequency is changed in proportion to the second data.

4. A tire pneumatic pressure detector comprising:

tire pneumatic pressure detection means for detecting a tire pneumatic pressure;

pneumatic pressure drop detection means for comparing the tire pneumatic pressure detected by said tire pneumatic pressure detection means with a predetermined value, and detecting a drop of the tire pneumatic pressure when the tire pneumatic pressure is lower than the predetermined value;

first memory means for storing first data associated with a timing of the drop of the tire pneumatic pressure; and second memory means for storing second data including one or more of: a lapse of time from said fist data, and third data associated with a running distance from a point associated with said first data;

wherein, the second data is output to a fault-diagnosing device when the fault-diagnosing device inputs a fault diagnosis signal.

5. A tire pneumatic pressure detector according to claim 4, further comprising an alarm for providing a warning when the drop of the tire pneumatic pressure occurs;

wherein said alarm changes said warning in accordance with the second data.

6. A tire pneumatic pressure detector according to claim 5, wherein said alarm further includes an alarm lamp having a flashing frequency when said warning is being provided, and wherein said flashing frequency is changed in proportion to the second data.

* * * * *